Patented Oct. 15, 1935

2,017,733

UNITED STATES PATENT OFFICE 2,017,733

PROCESS FOR FROSTING GLASS BULBS FOR INCANDESCENT LAMPS

Yukitoshi Sakakura, Shibuya Ku, Tokyo, Japan

No Drawing. Application May 5, 1933, Serial No. 669,582

2 Claims. (Cl. 91—70)

My invention relates to improvements in process for frosting glass bulbs for incandescent lamps consisting in solution containing soluble silicate of alkali and carbonate of alkali is coated inside the glass bulb and dried under application of heat so as to produce a layer of fine crystals of said salts inside the glass bulb for dispersing the light of incandescent lamp.

The object of the invention is to frost the glass bulbs easily without affecting its strength. Another object of the invention is to produce very fine and uniform crystals of salts to make the dispersion of light even and at the desired degree. Further object of the invention is to enable to add insoluble powder of colouring matter to adjust the degree of dispersion of light or to colour said frosted surface.

It is already known that soluble silicate of alkali, for instance solution of silicate of soda coated on glass and dried changes into crystals which is adapted for dispersing light. But such crystals of silicate of soda is rather rough and uneven and when added with powder or colouring matter into said solution the dispersion of light is apt to become uneven accordingly.

According to the present invention carbonate of alkali for instance carbonate of soda, is added into the solution of silicate of alkali. Said mixed solution is coated inside the glass bulb and is dried by application of heat, whereby light dispersing layer of fine and uniform crystals is produced inside the glass bulbs. When some insoluble powder or colouring matter is added into said solution the unevenness of dispersion of light owing to the rough and uneven crystals are entirely avoided. By adjusting the quantity of the powder added into the solution the degree of dispersing light may be adjusted and a frosted incandescent lamp of a desired dispersing power is obtained. The solution may be coated at a part of the bulb, or may be removed at a part after dried, whereby a glass bulb transparent at a part may be easily obtained.

An example of carrying out the present invention is explained. 200 grams of silicate of soda is dissolved into 1 litre of water. 200 grams of hydro-carbonate of potash is mixed therein and the precipitate produced thereby is removed. The solution obtained is uniformly coated inside the glass bulb for incandescent lamp and is dried for several minutes at a temperature of 350 centigrade, whereby a light dispersing layer of fine and uniform crystals is produced inside the glass bulb. Hot air or heated carbonic acid gas may be introduced into the bulb to accelerate the formation of crystals while drying. Said coating and drying of the solution may be repeated several times, if necessary, until a desired frosting is obtained. Or said solution may be coated inside the glass bulb which is previously frosted by any known frosting means. Any soluble colouring matter or insoluble powder such as oxide of zinc may be added into the solution to give colour or adjust the degree of frosting.

Having now particularly described and ascertained the nature of my said invention and in what manner the same is to be performed I declare that what I claim is:—

1. In a process for internally frosting incandescent lamp bulbs, the steps of coating the inside of the bulbs with a solution including soluble alkaline silicate and sodium carbonate, and baking the coating so as to produce a light dispersing medium of fine and uniform crystals.

2. A process for frosting glass comprising coating the glass with a precipitate-freed solution of 200 grams each of an sodium carbonate and alkali soluble silicate into a litre of water, and baking said coating for several minutes at 350° C.

YUKITOSHI SAKAKURA.